D. SHEA.
GARDEN IMPLEMENT.
APPLICATION FILED APR. 5, 1919.

1,334,681.

Patented Mar. 23, 1920.

D. Shea
Inventor

Witness

By Attorneys

UNITED STATES PATENT OFFICE.

DENNIS SHEA, OF NORTH ADAMS, MASSACHUSETTS.

GARDEN IMPLEMENT.

1,334,681.     Specification of Letters Patent.     Patented Mar. 23, 1920.

Application filed April 5, 1919. Serial No. 287,731.

*To all whom it may concern:*

Be it known that I, DENNIS SHEA, a citizen of the United States, residing at North Adams, in the county of Berkshire and State of Massachusetts, have invented a new and useful Garden Implement, of which the following is a specification.

My invention relates to garden implements particularly to cabbage pullers and has as its object to provide a hand implement which will facilitate the operation of uprooting the cabbage and obviate bending over, thereby rendering the work easier to the person and enabling him to accomplish a greater amount of work than is ordinarily accomplished by hand.

A further object of the invention is to provide a cabbage puller which may be used to great advantage in harvesting cabbage and which will not injure the same in any way.

Another object is to provide a device of this general character which is simple in construction, consists of a minimum number of parts, and which may be manufactured and sold at a minimum cost.

With the above and other objects in view which will become apparent from the following, the invention consists of combinations of elements, arrangement of parts formations and constructions, and general assemblage, all of which will be fully amplified hereinafter and defined in the appended claim.

Figure 1:
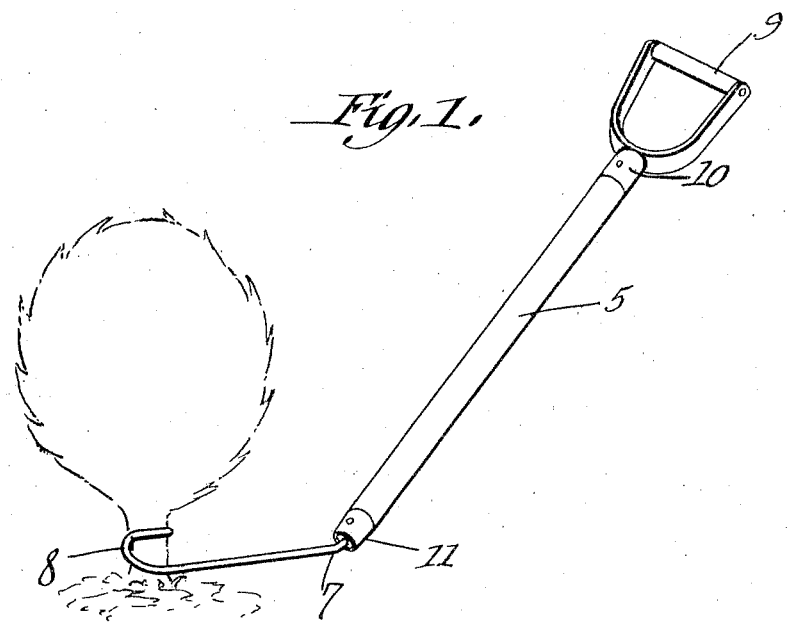

On the drawings Figure 1 is a perspective of my implement; and

Figure 2:
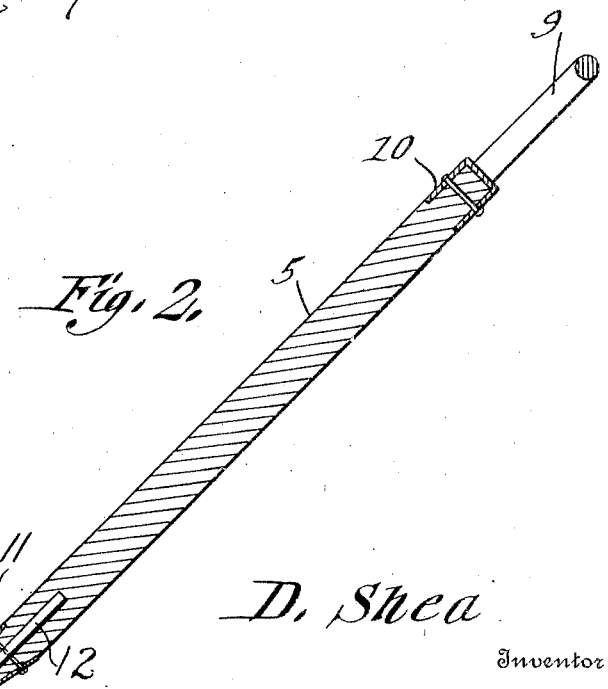

Fig. 2 is a view of the same partly in longitudinal section.

The cabbage puller forming the subject matter of this application comprises a handle 5 having a transverse grip 9 at its upper end, the grip being assembled with the handle by means of a socket 10. The device includes a hook embodying a shank 7 and a bill 8, located in a common plane disposed at an obtuse angle to the plane defined by the handle 5 and the grip 9, the shank having an angular end 12 mounted in the lower end of the handle 5 within a ferrule 11. The shank 7 is inclined laterally with respect to a plane coinciding with the axis of the handle 5 and located at right angles to the grip 9. Owing to the specific construction of the device as above set forth, an operator, walking along the rows of cabbages, may conveniently pull the cabbages, as indicated in Fig. 1.

What is claimed is:—

A cabbage puller comprising a handle having a transverse grip at its upper end; and a hook embodying a shank and a bill located in a common plane disposed at an obtuse angle to the plane defined by the handle and the grip, the shank being mounted in the lower end of the handle, and being inclined laterally with respect to a plane coinciding with the axis of the handle and located at right angles to the grip.

In testimony that I claim the foregoing as my own I have hereto affixed my signature in the presence of two witnesses.

DENNIS SHEA.

Witnesses:
   FRED BRASSARD,
   WILL HOLLIGAN.